(12) United States Patent
Chase et al.

(10) Patent No.: US 7,837,142 B2
(45) Date of Patent: Nov. 23, 2010

(54) SUPERSONIC AIRCRAFT JET ENGINE

(75) Inventors: James D. Chase, Reno, NV (US);
German Andres Garzon, Reno, NV (US)

(73) Assignee: Aerion Corporation, Reno, NV (US)

( * ) Notice: Subject to any disclaimer, the term of this patent is extended or adjusted under 35 U.S.C. 154(b) by 191 days.

(21) Appl. No.: 11/973,813

(22) Filed: Oct. 9, 2007

(65) Prior Publication Data
US 2009/0014597 A1    Jan. 15, 2009

Related U.S. Application Data

(60) Provisional application No. 60/851,403, filed on Oct. 13, 2006, provisional application No. 60/851,630, filed on Oct. 13, 2006, provisional application No. 60/851,841, filed on Oct. 12, 2006.

(51) Int. Cl.
*B64D 33/02* (2006.01)
(52) U.S. Cl. ............... 244/53 B; 244/110 B; 244/129.4
(58) Field of Classification Search ............ 244/110 B, 244/129.4, 53 B; 181/214; 415/115, 914; 137/15.1
See application file for complete search history.

(56) References Cited

U.S. PATENT DOCUMENTS

| | | | |
|---|---|---|---|
| 3,242,671 A * | 3/1966 | Moorehead ................. 137/15.1 |
| 3,485,252 A | 12/1969 | Brown | |
| 3,489,375 A | 1/1970 | Tracy | |
| 4,007,891 A * | 2/1977 | Sorensen et al. ........... 244/53 B |
| 4,372,505 A * | 2/1983 | Syberg ...................... 244/53 B |
| 4,620,679 A * | 11/1986 | Karanian ................... 244/53 B |
| 4,919,364 A * | 4/1990 | John et al. ..................... 244/55 |
| 5,005,782 A * | 4/1991 | Falempin et al. ........... 244/53 B |
| 5,351,480 A | 10/1994 | Kretschmer | |
| 5,586,735 A * | 12/1996 | Falempin et al. ........... 244/53 B |
| 5,706,649 A * | 1/1998 | Robinson et al. ............ 60/226.2 |
| 5,826,424 A * | 10/1998 | Klees ............................ 60/262 |
| D417,184 S * | 11/1999 | Hartmann et al. ........... D12/333 |
| 5,987,880 A * | 11/1999 | Culbertson .................... 60/204 |
| 6,082,669 A * | 7/2000 | Bardagi et al. ............. 244/53 B |
| 6,390,414 B1 * | 5/2002 | Medvedev ................. 244/53 B |
| 6,634,595 B2 * | 10/2003 | Koncsek et al. ............ 244/53 B |

(Continued)

FOREIGN PATENT DOCUMENTS

DE    1 078 375    3/1960

(Continued)

*Primary Examiner*—Timothy D Collins
*Assistant Examiner*—Justin Benedik
(74) *Attorney, Agent, or Firm*—William W. Haefliger

(57) ABSTRACT

Jet engine inlet structure of a supersonic aircraft comprising the structure having an inlet ramp and an cowl lip spaced outwardly of the ramp so that entering air flows between the ramp and lip, the lip and ramp configured to produce a first oblique shock that extends outwardly from a forward portion of the ramp to pass ahead of the lip, and a terminal shock that extends outwardly from a rearward portion of the ramp to one of the following $x_0$) a region just ahead of the lip
$x_1$) substantially to said lip.

A non-uniform shock system is created that generates a central region of nearly isentropic compression and relatively ram recovery and an outer region of reduced ram recovery but entailing reduced cowl angle and drag. Translating cowl structure and also nozzle integration with the fuselage contour to reduce boat tail drag are also provided.

16 Claims, 12 Drawing Sheets

U.S. PATENT DOCUMENTS

| | | |
|---|---|---|
| 6,705,569 B1 * | 3/2004 | Sanders et al. ............ 244/53 B |
| 6,793,175 B1 * | 9/2004 | Sanders et al. ............ 244/53 B |
| 6,910,327 B2 * | 6/2005 | Sakurai et al. ............... 60/204 |
| 6,920,890 B2 * | 7/2005 | Sanders et al. ................ 137/12 |
| 6,938,854 B2 * | 9/2005 | Nelson ....................... 244/120 |
| 6,966,524 B2 * | 11/2005 | Stuhr ....................... 244/53 B |
| 2002/0096598 A1 | 7/2002 | Nelson |
| 2004/0140397 A1 | 7/2004 | Dun |

FOREIGN PATENT DOCUMENTS

| | | |
|---|---|---|
| FR | 1204525 | 1/1960 |
| GB | 856507 | 12/1960 |
| GB | 967720 | 8/1964 |

\* cited by examiner

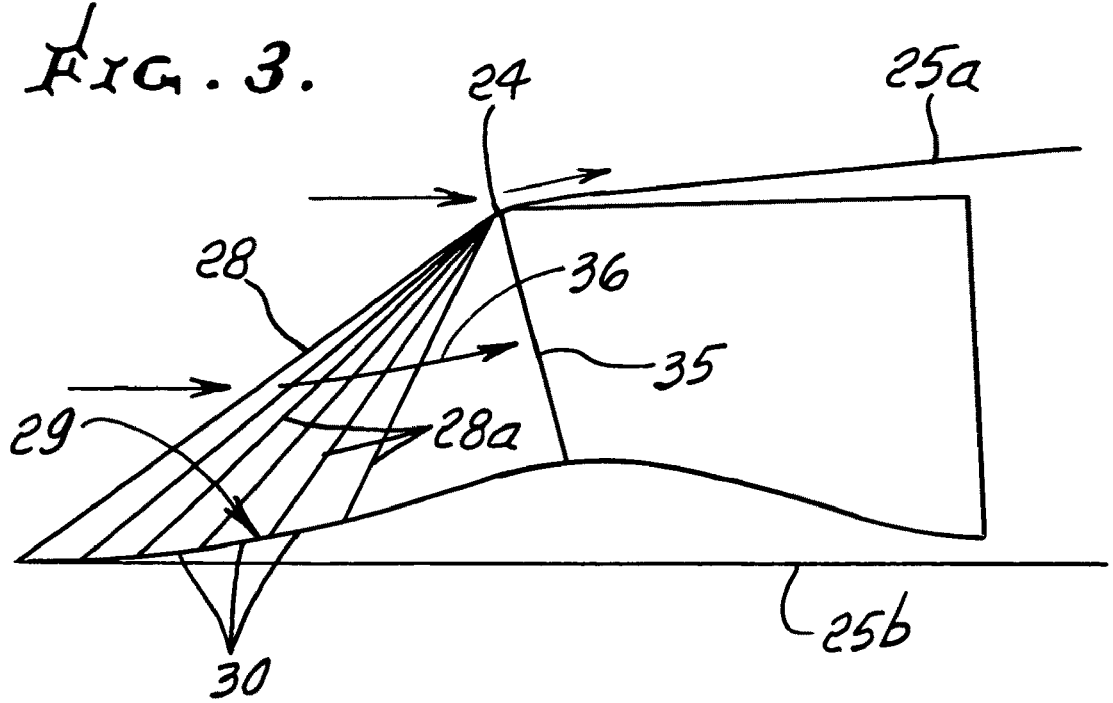
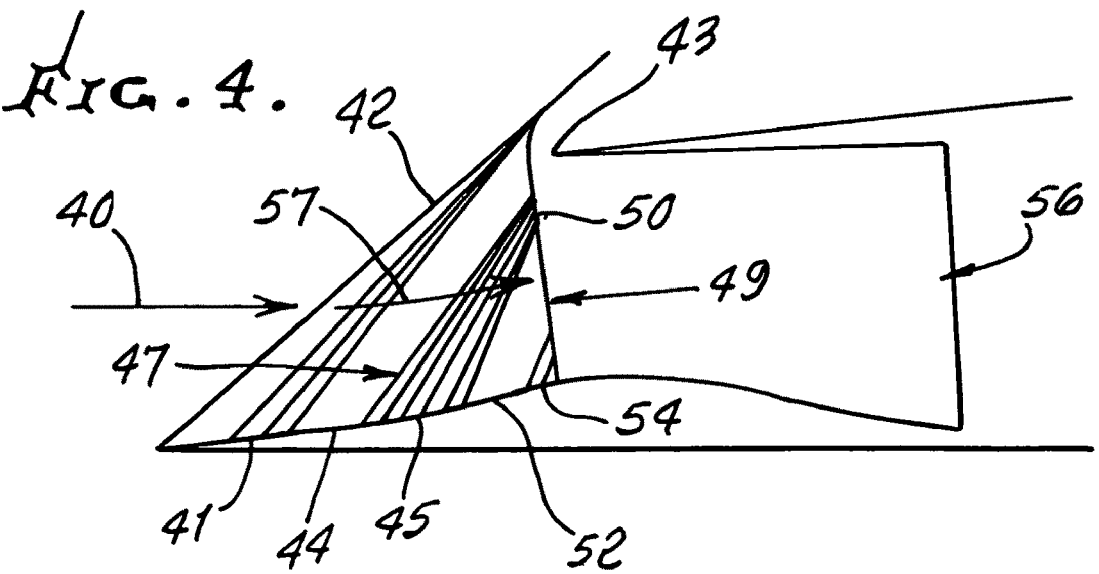

RAM RECOVERY DISTRIBUTION
-2-D GRADIENT RECOVERY RAMP
AT MACH 1.65 FREESTREAM

CONTOURS OF RAM RECOVERY FOR 3-DIMENSIONAL GRADIENT COMPRESSION RAMP INLET

CONTOURS OF MACH NUMBER

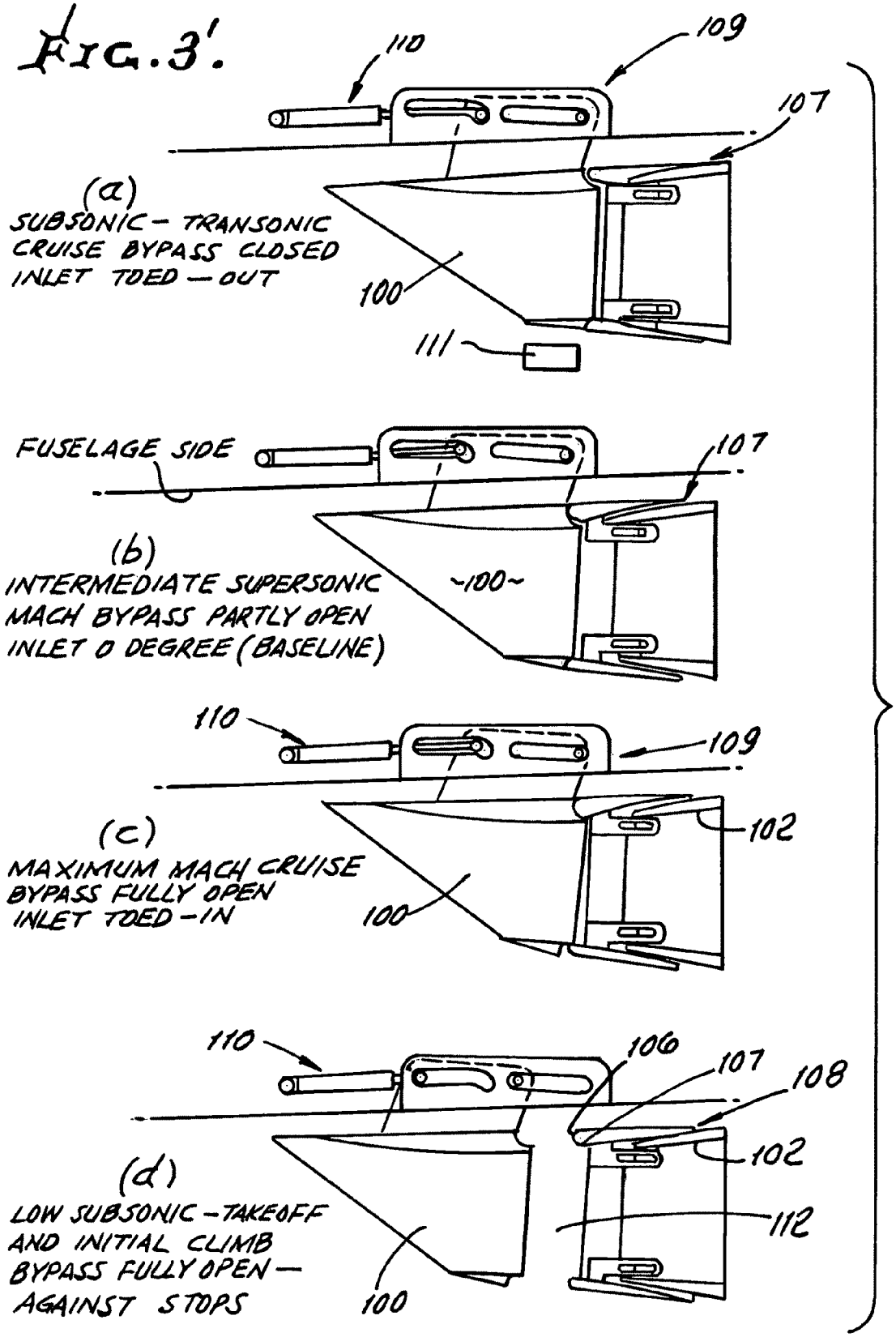

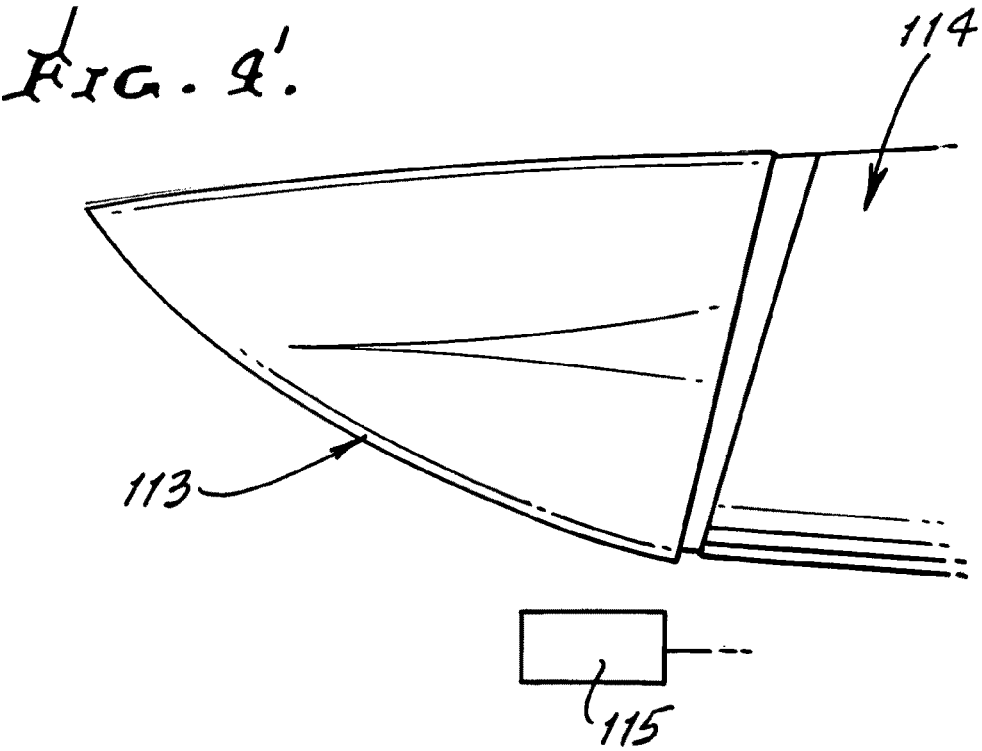
FIG. 9'.
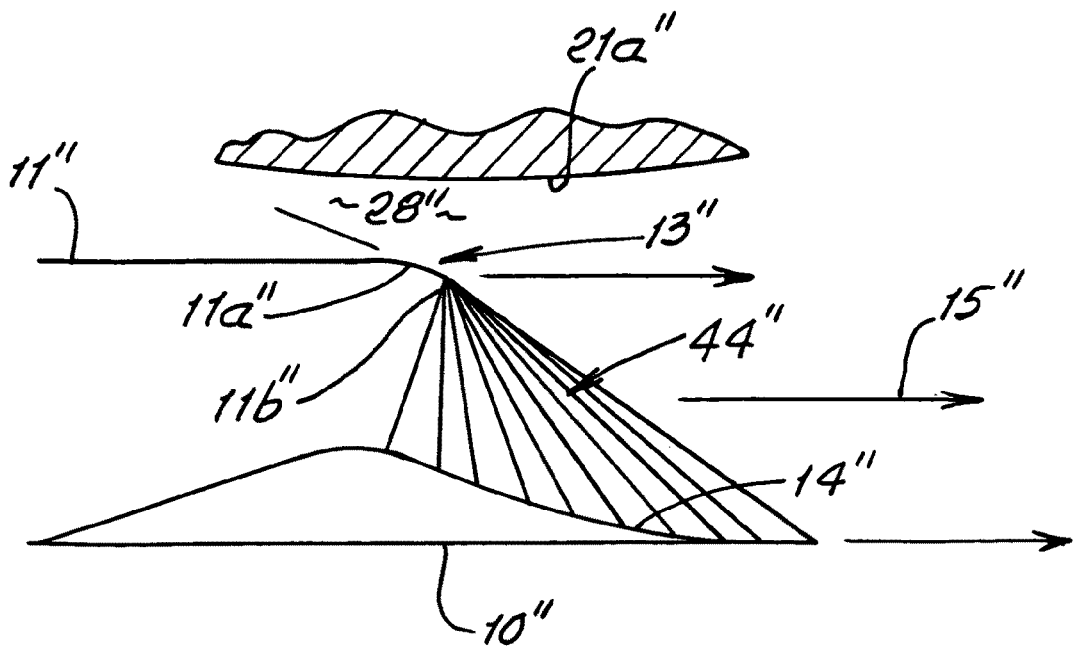
FIG. 1".

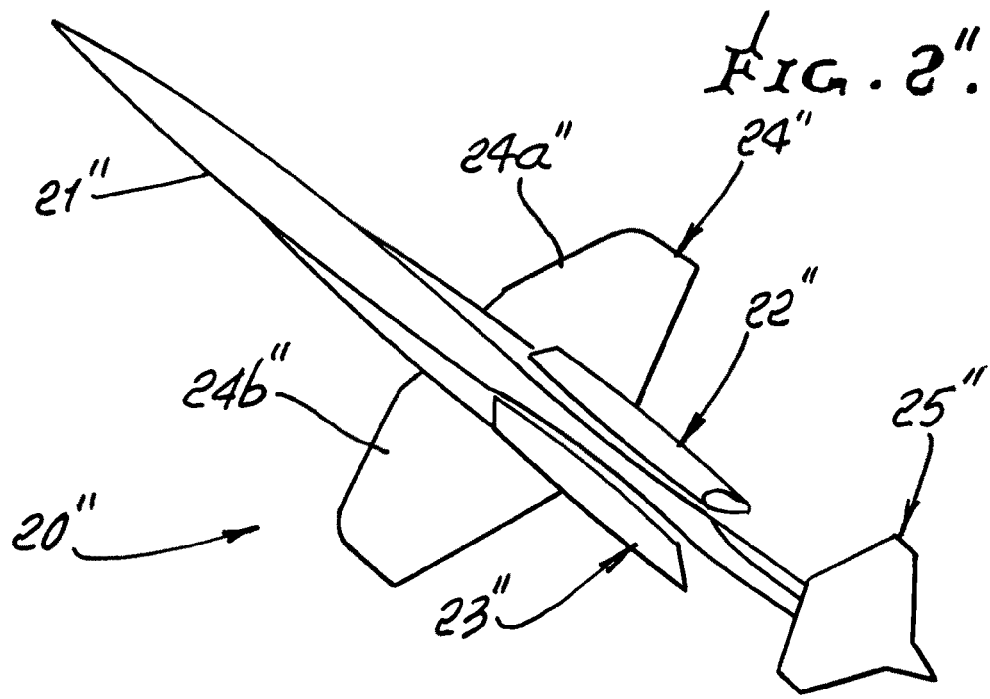
FIG. 2".
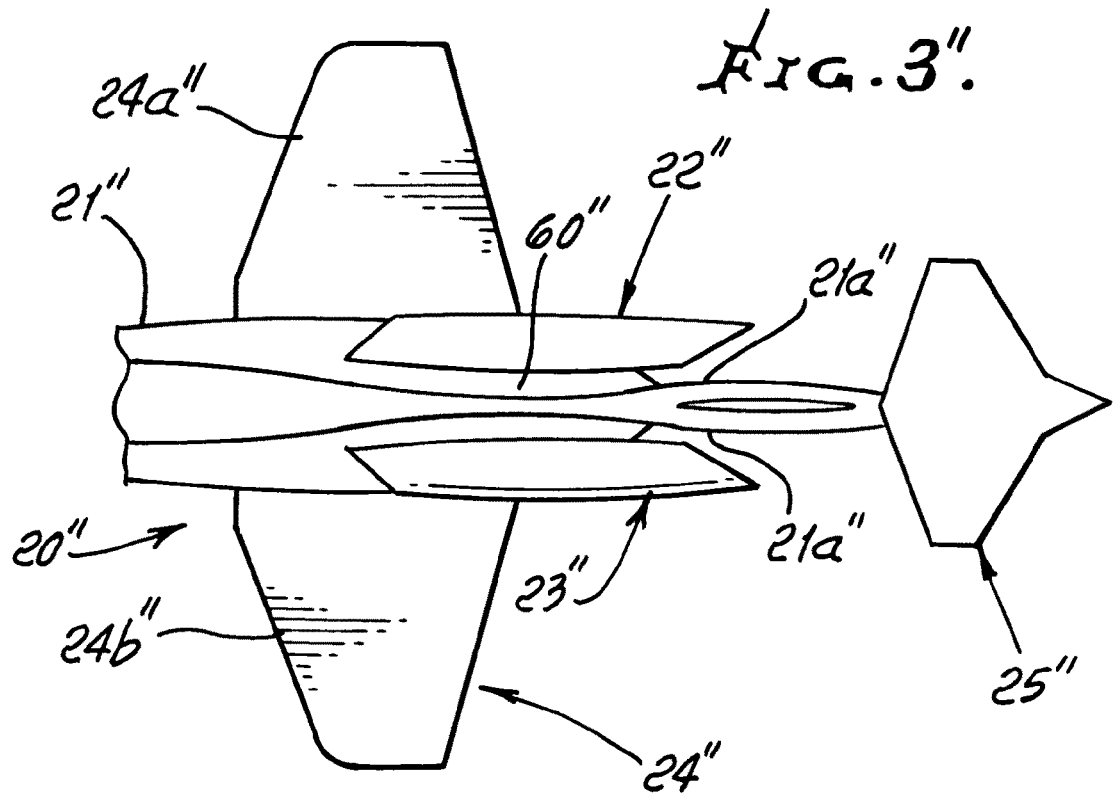
FIG. 3".

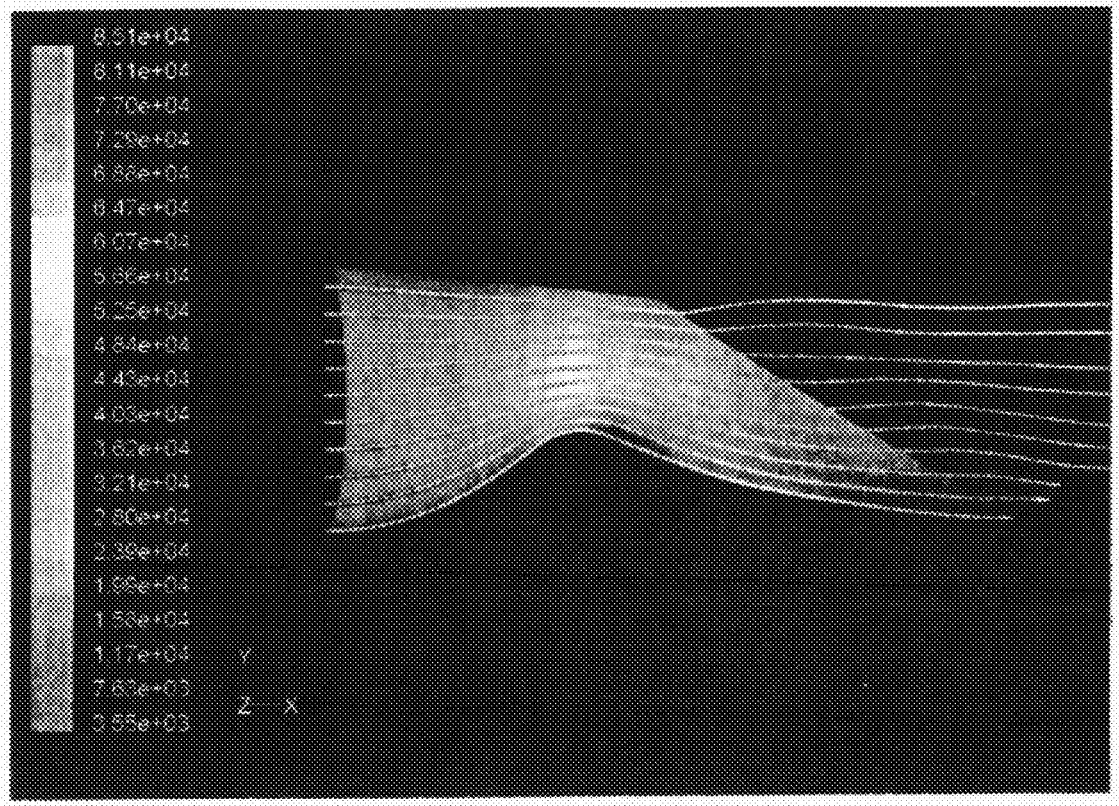
Fig. 5".
NOZZLE PRESSURE CONTOURS AND FLOW PATHLINES —
HIGH PRESSURE RATIO AT AIRCRAFT SUPERSONIC SPEED NOZZLE PRESSURE CONTOURS AND FLOW PATHLINES—
LOW PRESSURE RATIO AT AIRCRAFT LOW SPEED CONDITION

SUPERSONIC AIRCRAFT JET ENGINE

This application claims priority from provisional application Ser. No. 60/851,403, filed Oct. 13, 2006, Ser. No. 60/851,630, filed Oct. 13, 2006 and Ser. No. 60/851,841, filed Oct. 12, 2006.

BACKGROUND OF THE INVENTION

This invention relates generally to supersonic aircraft engine air inlet and nozzle systems, and more particularly to enhancement of efficiency of such systems. It also relates to reducing or eliminating the requirement for stabilizing bleed air.

Supersonic aircraft engine air inlet systems are faced with a difficult challenge in maximizing performance of the aircraft. At supersonic speeds the engine inlet must slow the air velocity to less than the speed of sound, typically less than Mach 0.6 at the engine inlet face. To accomplish this, the inlet must subject the air to a shock system. In passing through the shock system losses in total pressure occur which reduce the net thrust and net thermal efficiency of the engine. These losses can be reduced to negligibly low levels by incorporating a suitably shaped isentropic compression surface, however as the flow is decelerated near Mach one, inlet stability problems occur for such high efficiency inlets as flow approaches two possible flow conditions. These are called subcritical where the flow is subsonic ahead of the inlet throat (the point of minimum cross-sectional normal to the local flow) or supercritical where the flow passes the throat supersonically with a series of oblique shock waves.

Inlets are typically designed to place a final terminal shock of a given strength near the throat where the flow will pass from supersonic to subsonic flow, the strength of which is a measure of relative flow stability. A very weak terminal shock, for example decelerating the flow from Mach 1.1 down to Mach 0.91, will exhibit very little total pressure loss, but would be prone to flow instabilities such as "buzz" where the inlet rapidly oscillates from subcritical to supercritical operation. Such instabilities could be triggered by changes in temperature, moisture, or flow angle such as from gusts. To prevent this, supersonic inlets typically are designed to operate with a terminal shock strength between 1.2 to 1.3, which results in a small but un-recoverable loss in total pressure of 0.8 to 2%.

In addition, supersonic inlets are typically fitted with bleed air systems to remove a small portion of the boundary layer on the compression surface at the terminal shock location. The boundary layer bleed is needed to hold the shock at the design location, prevent instability, and to prevent boundary layer separation. This can be explained as follows: A shock system represents a very strong adverse pressure gradient to a boundary layer which will cause the boundary layer to thicken or separate. A rule of thumb is that a Mach 1.3 normal shock strength will induce separation of even a very fresh boundary layer. Even if not separated, the boundary layer will thicken at the shock, reducing the effective throat area. Reducing the throat area in turn strengthens the shock, further increasing the adverse pressure gradient and reducing the effective throat area, and so forth. The result can either be "buzz" or the shock may move forward to a point of a stronger terminal shock well ahead of the intended location. This condition results in significantly higher overall pressure losses and variable pressures to the engine (distortion)

The stabilizing bleed system represents an additional loss in net thrust of the system, as it requires added pressure loss (or mechanical pumping) to induce the bleed flow.

A further consequence of low loss nearly isentropic compression for external compression inlets is cowl wave drag. In order to generate the shocks for low loss supersonic compression the flow must be turned from the free stream direction. The greater the required efficiency or design Mach number, the greater the flow turning angle. For a typical external compression inlet with some spillage around the inlet lip (local mach/mach=1 or M/M*<1) the flow spilling around the outside of the inlet lip incurs a drag penalty (additive drag). The additive drag is a function of the flow angle, and thus the total net thrust becomes a trade-off, between pressure recovery loss through the engine inlet compression system and inlet additive drag. The maximum thrust occurs with less than isentropic compression (see AIAA 2004-4492 "Multidisciplinary Optimization of a Supersonic Inlet Using a Cartesian CDF Method" paper by Rodriguez).

Present day commercial supersonic aircraft concepts anticipate the use of bypass fanjet engines rather than the traditional turbojets such as on Concorde. The bypass fanjet is distinct from the turbojet in bypassing additional air from the initial fan stages around the outside of the engine core, (compressor, combustor and turbine), providing improved propulsive efficiency and reduced noise. A characteristic of the fanjet engine is that reductions in net thrust from inlet pressure recovery losses are significantly lower for the outer fan air than for the inner core air destined to pass through the core of the engine.

The invention also relates generally to supersonic aircraft engine air inlet designs operating efficiently over a broad range of conditions from very low speeds for takeoff to very high speed cruise.

Jet powered aircraft derive thrust by means of turbojet or turbofan engines which induce flow through an air inlet, increase the pressure and temperature of the induced flow and exhaust it out an appropriate nozzle at higher velocity than it entered. A critical challenge for the successful design of supersonic aircraft is air inlet systems which can operate at low speed and high thrust conditions for takeoff and in flight conditions ranging from subsonic to transonic, and supersonic regimes. Typically an inlet designed for efficient low drag supersonic cruise features very thin sharp inlet lips. At the low speeds needed for takeoff and initial climb the engine requires a very high airflow and induces airflow velocities near the inlet lip much greater than the freestream velocity. This results in a "vena contracta" typical of flow through a sharp edged orifice which limits the flow volume and creates large flow separations, pressure losses and distortions which are unacceptable to the engine. An early solution to this dilemma was the "translating cowl" in which the inlet was made in two pieces such that the most forward portion incorporating the sharp supersonic lip moved forward away from rear portion of the inlet and exposed a second inlet suitable for ingesting additional air through the lateral opening created between the forward and aft inlet sections.

An additional challenge for supersonic inlets is accommodating the changing requirements with speed. Typically they incorporate a forward ramp or spike surface ahead of the enclosed portion of the inlet which presents an angle to the flow to generate a weak shock system to slow and compress the air before entering the enclosed portion of the inlet. The ideal ramp angle for such an inlet changes with Mach number.

A third difficulty is the changing characteristic of the airflow demands of the engine. Often as Mach number increases the engine will accept less air than provided by the inlet system, and the excess must be spilled around the inlet or bypassed through some auxiliary openings in the inlet internal and external surfaces. In supersonic flow it generally creates a smaller drag penalty on the aircraft to bypass air after it is taken into the inlet than to spill it ahead of the inlet. Many supersonic aircraft have incorporated complex and heavy variable ramp and bypass systems to accommodate these supersonic matching problems.

Improvements are needed to provide lighter, more efficient and less complex means for accommodating the diverse requirements of supersonic aircraft inlets.

The invention further relates generally to supersonic aircraft jet engine nozzle efficient integration with the aircraft fuselage, and also to engine nacelle efficient integration with the fuselage.

Jet powered aircraft derive the thrust required by means of engines which take in free-stream air, increase the pressure and temperature of the air, and reaccelerate that air to a higher velocity than when it entered. A critical part of the propulsion system is the nozzle, which takes the air which leaves the engine at high total pressure but reduced velocity and accelerates it to the higher exhaust velocity. For supersonic aircraft the pressure ratio (of engine exhaust total pressure divided by ambient pressure) exceeds the critical pressure ratio and requires an expansion of the exhaust from subsonic to supersonic velocity. The nozzle must provide a carefully designed flow path to allow this expansion with minimal loss in total pressure through shock waves. The flow path of a typical nozzle involves a decrease in area as flow is accelerated from subsonic velocity at the engine exhaust to a minimum throat area where the flow attains sonic velocity (Mach 1.0) and from there expands in area again to accelerate the flow to final supersonic velocity.

The most basic nozzle for such applications, is the convergent-divergent or C-D nozzle. The efficiency of the fixed C-D nozzle varies significantly with the different pressure ratios and operating conditions required of a supersonic aircraft, whereas it has been found that a "plug" nozzle provided comparable peak efficiency to a C-D nozzle with less efficiency loss away from the design operating condition. The plug nozzle consists of a circular outer cowl duct with an inner spike located in the center but projecting behind the exit plane of the outer duct. Most (but not necessarily all) of the supersonic expansion takes place on the externally exposed surface of the spike. Expanding a flow to supersonic speed with minimum pressure loss requires a nearly isentropic expansion and involves turning the flow through definite angle. Achieving maximum thrust from the nozzle requires that at its final accelerated velocity the flow must be approximately aligned with the flight direction. This in turn requires that prior to supersonic expansion the flow must be turned towards the spike, resulting in the external nacelle surface immediately ahead of the nozzle exit lip presenting a significant angle to the external flow. This angle forces the external flow to expand locally, creating a negative pressure zone and drag on the nacelle surface. This drag is termed "boat tail drag".

There is need for improvements in jet engine nozzles that provide efficient thrust conversion over wide operating ranges. There is need for engine nacelle, fuselage and wing configurations in combinations that significantly reduce supersonic boat tail drag penalties.

SUMMARY OF THE INVENTION

It is one major object of the invention to provide an improved inlet structure that meets the need for enhanced efficiency. Basically, the improved structure has:

a) an inlet ramp and a cowl lip spaced outwardly of the ramp so that entering air flows between the ramp and lip, b) the lip ramp configured to produce a first oblique shock that extends outwardly from a forward portion of the ramp to pass ahead of the lip, and a terminal shock that extends outwardly from a rearward portion of the ramp to one of the following:

$x_0$) a region just ahead of the lip $x_1$) substantially to said lip.

Another object is to provide an inlet ramp which, in axial radial planes has a first intermediate portion that has shallow concavity, configured to produce an additional oblique shock or shocks that extend from said first intermediate portion generally forward of the lip and within the flow path of air through the nozzle.

An added object is to provide the ramp to have a second relatively intermediate extent that is relatively straight, and located rearwardly of said first intermediate portion, and configured to produce an oblique shock or shocks that extend from said second intermediate portion toward a part of said terminal shock that is spaced from the lip.

Further objects include locating the engine on a supersonic aircraft, proximate the fuselage and lapping the wing trailing edge; indenting the side of the fuselage facing the engine nacelle, for area rule configuring. In one configuration, the engine cowl lip is angled outwardly and rearwardly from a lateral plane normal to the longitudinal axis of the fuselage; and two of such engines are provided at and proximate opposite sides of the fuselage, when the lapped wing is located aft of the mid-point of the fuselage length. Basically, the inlet is configured to have a non-uniform pressure recovery and shock system from inner core flow to outer fan flow.

It is another major object of the invention to provide improvements in practical supersonic aircraft jet engine inlets that meet the above requirements. The invention provides an inlet separated laterally into two or three sections. The most forward section comprises a non-axisymmetric supersonic inlet with a protruding forward surface (as typified by 2-D ramp inlets, stream traced inlets, and the circular gradient recovery inlet).

An additional major object of the invention is to provide improvements in supersonic aircraft jet engine nacelle and nozzle configurations, that meet the described needs. This aspect of the invention provides for location of a nozzle boat tail (turned) portion laterally closer to the aircraft fuselage than the engine exhaust expansion ramp, as in installations wherein the engine is located in proximity to the fuselage. As will be seen, the nacelle rearwardmost edge may define a nozzle outlet, where the plane containing that edge is "beveled" to be angled forwardly and toward the fuselage.

Another object is to provide the fuselage with reduced cross sections along fuselage length at zones closest to the jet engine nacelle. Two such engines configurations may be provided, at opposite sides of the fuselage, as will appear.

Another object is to provide for area ruling of the reduced cross sections of the fuselage, relative to engine nacelle or nacelles, for enhanced efficiency. Such area ruling may take into consideration the location of the wing root zone, in relation to lapping of the wing by the nacelle or nacelles, along nacelle length or lengths.

These and other objects and advantages of the invention, as well as the details of an illustrative embodiment, will be more fully understood from the following specification and drawings, in which:

DRAWING DESCRIPTION

FIG. 3 is a schematic illustrative of an isentropic supersonic air inlet;

Figure 1:
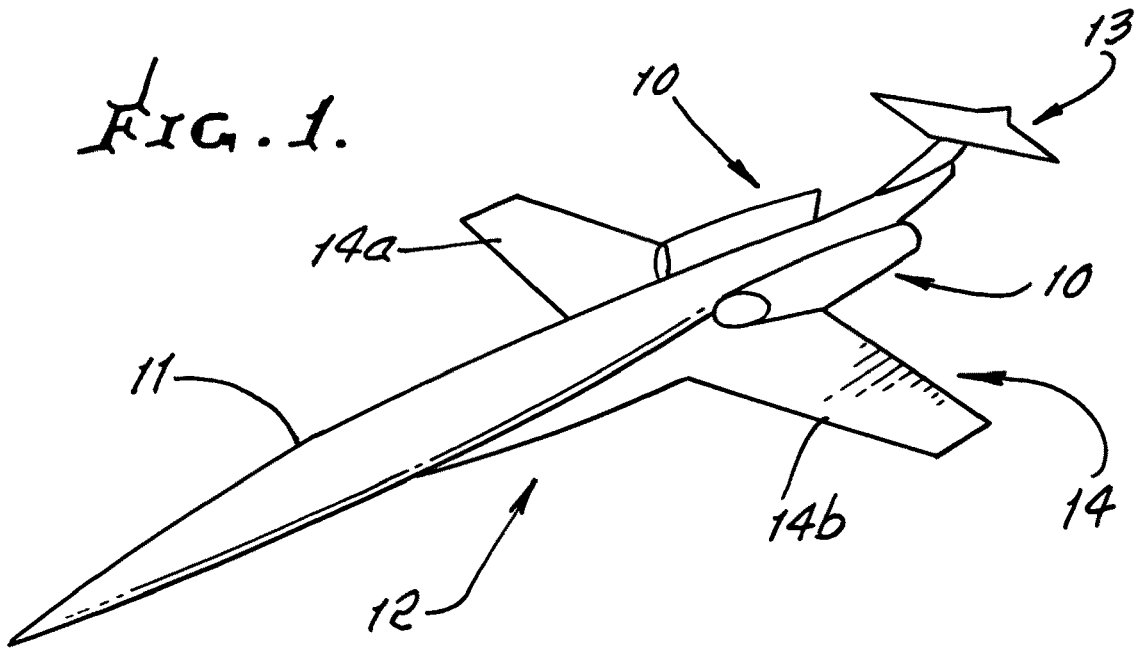
FIG. 1 is a view showing a supersonic aircraft incorporating the invention.
Figure 2:
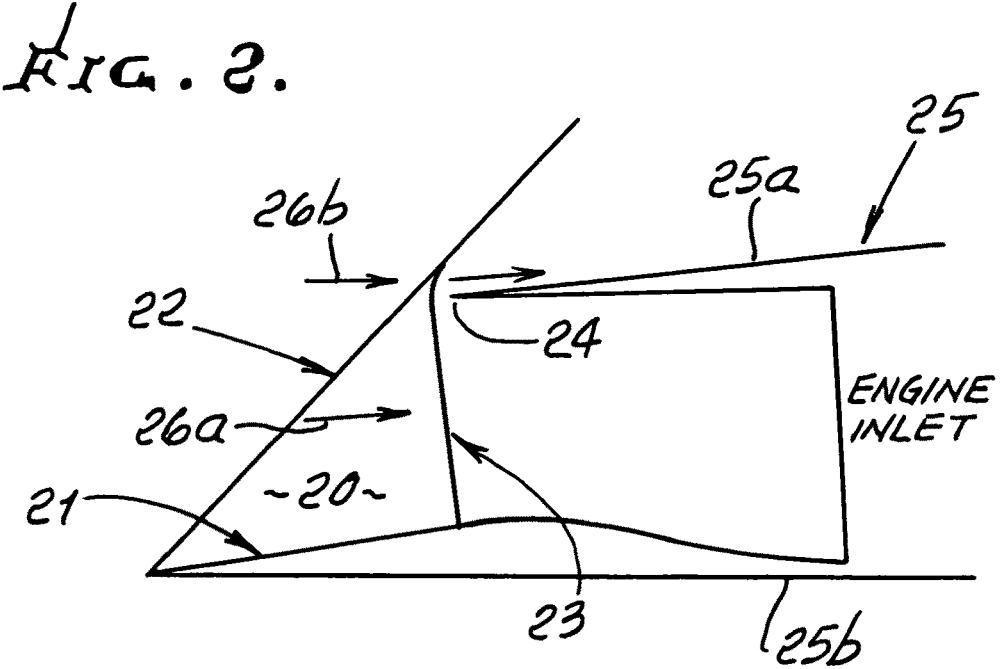
FIG. 2 is a schematic view illustrating the air compression system for a basic two shock external compression air inlet.
Figure 5:
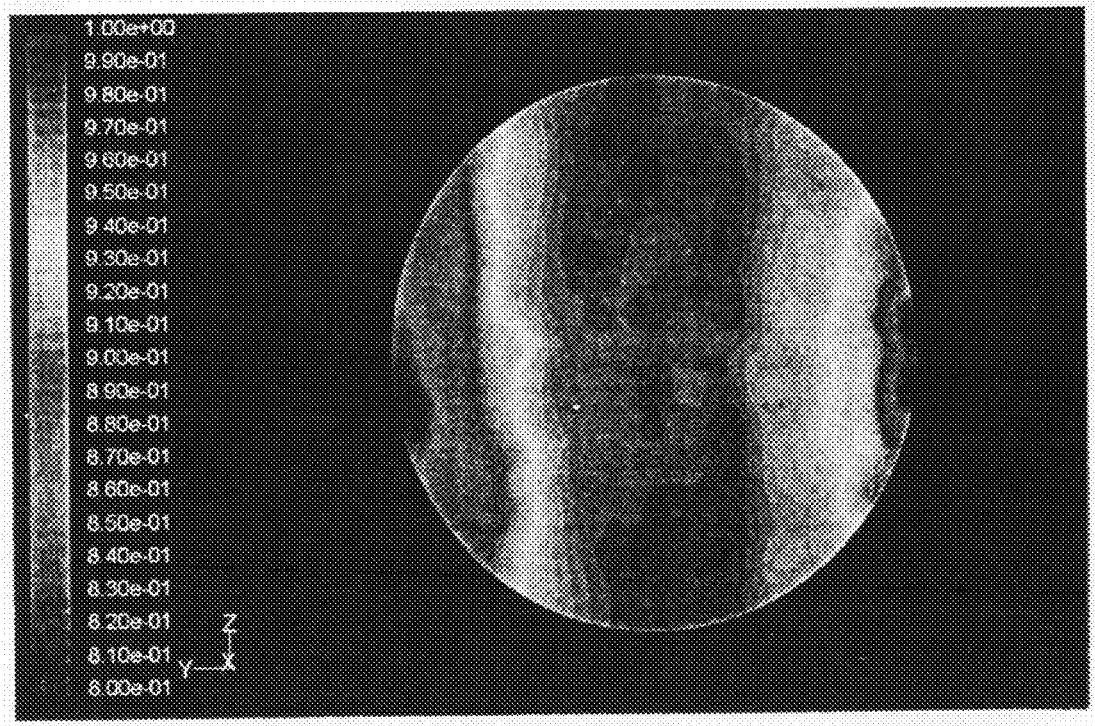
FIG. 5 shows ram recovery distribution at the engine fan face for an engine having a basic two dimensional ramp system.
Figure 6:
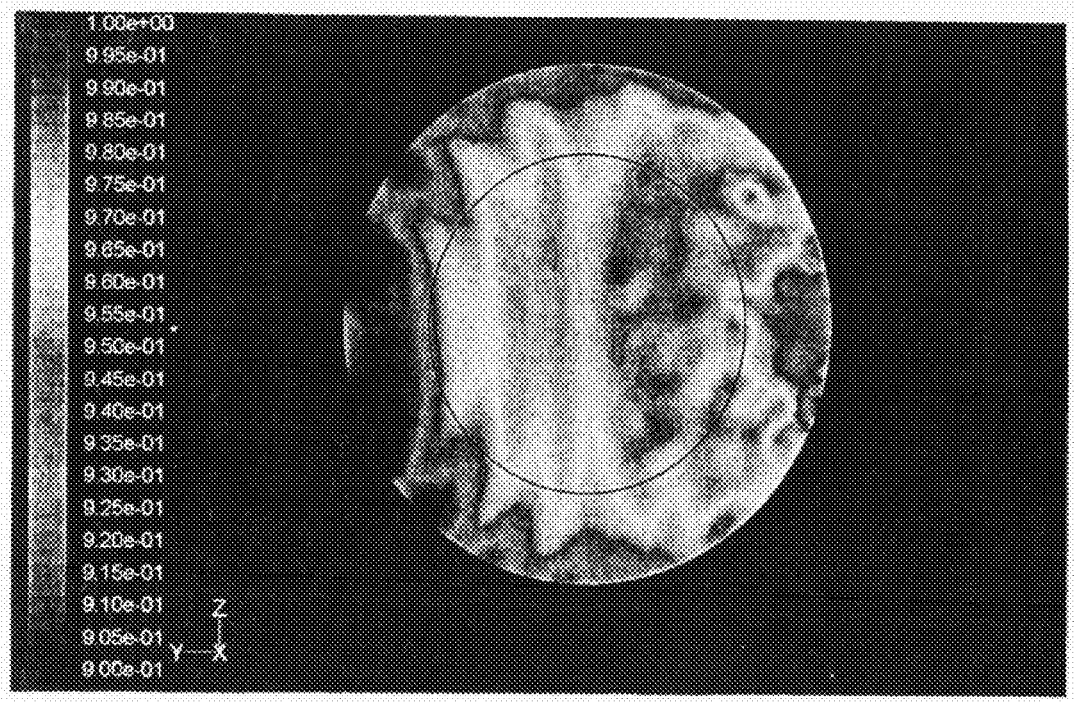
FIG. 6 shows contours of ram recovery for a three dimensional gradient compression ramp inlet.
Figure 7:
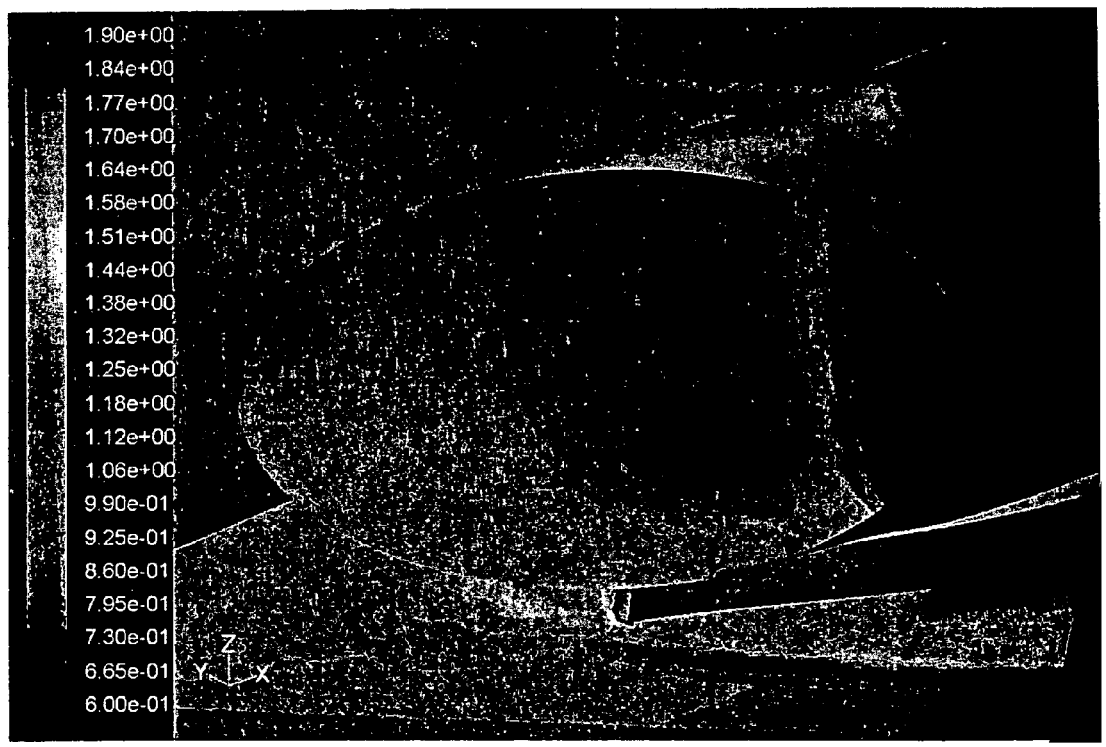
FIG. 7 shows contours of Mach number in an isometric view of a three dimensionally designed engine inlet at Mach 1.5.
Figure 1:
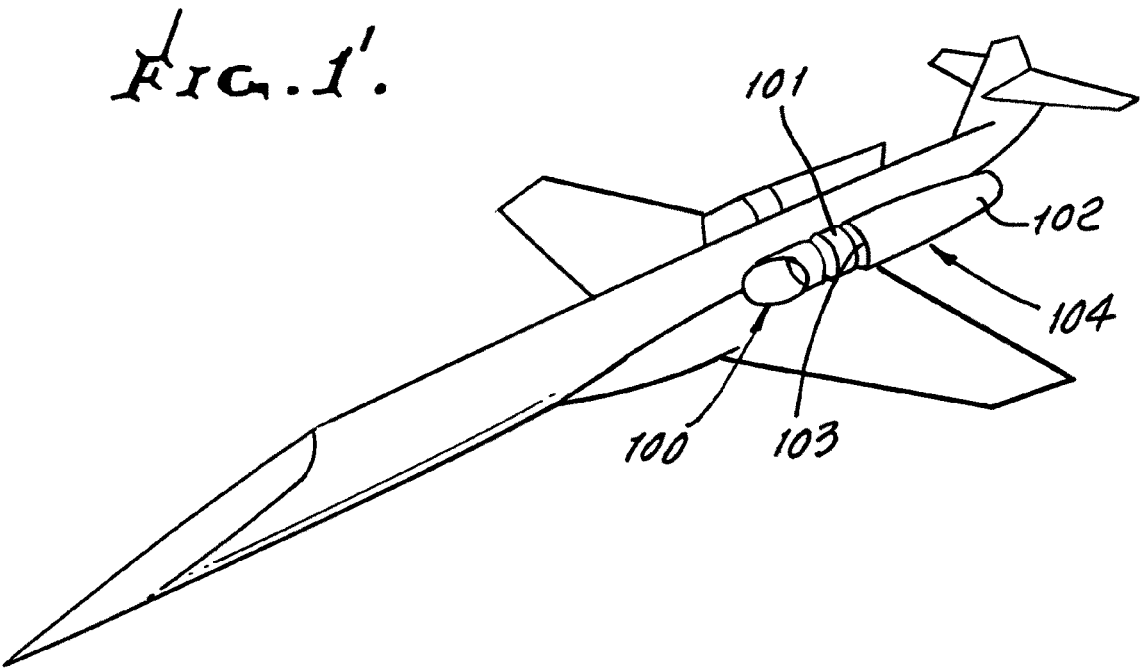
Figure 2:
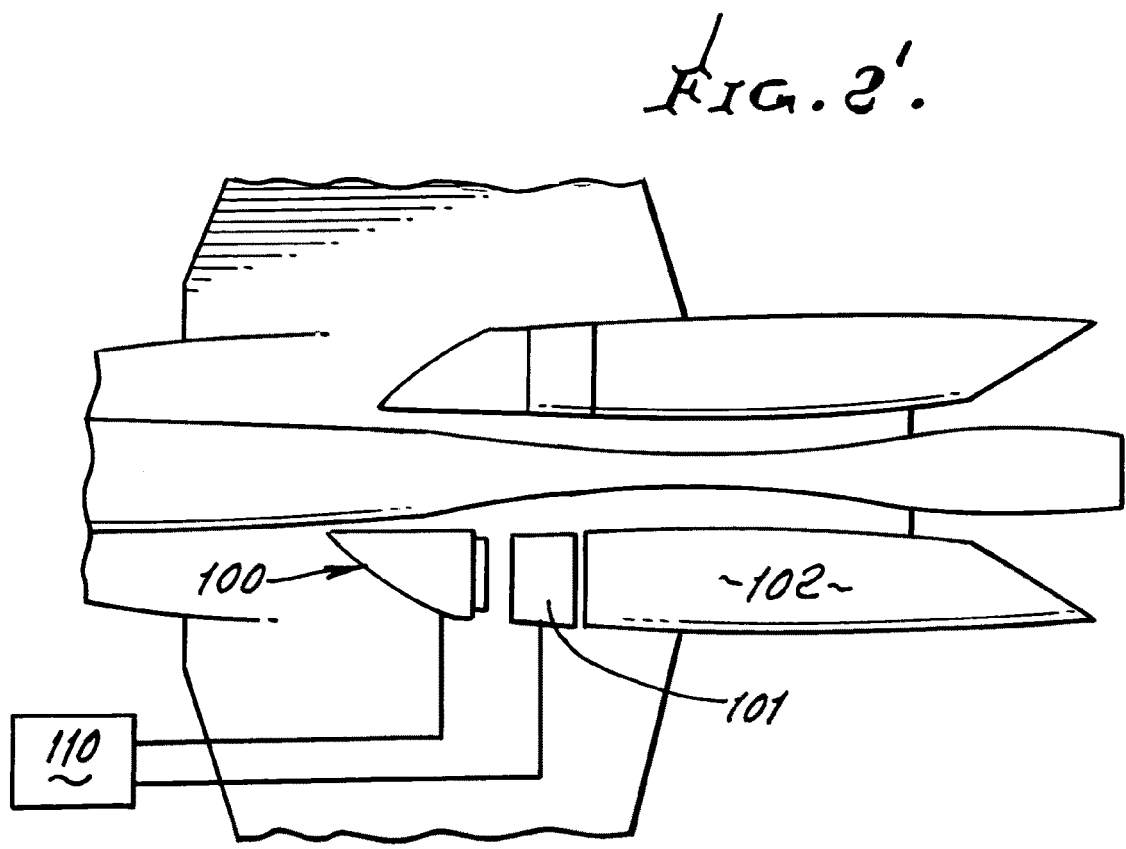
Figure 4:
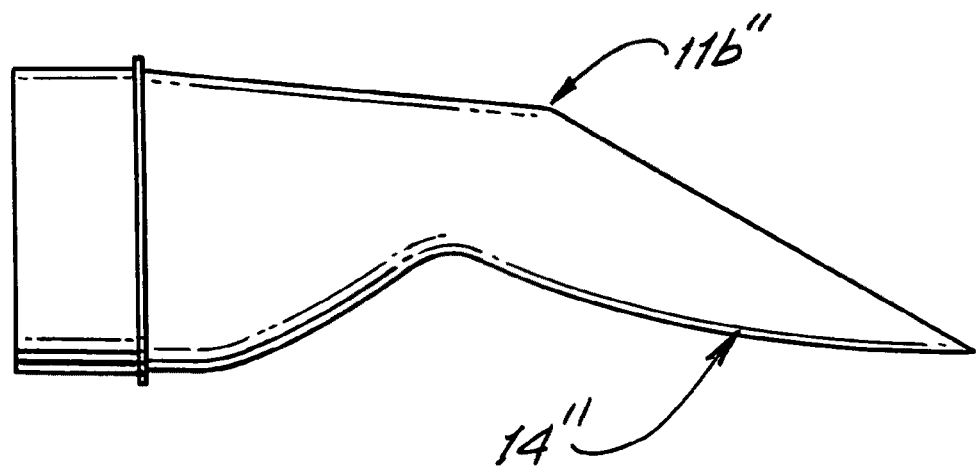
FIG. 4 shows a gradient pressure recovery inlet shock system.
Figure 7:
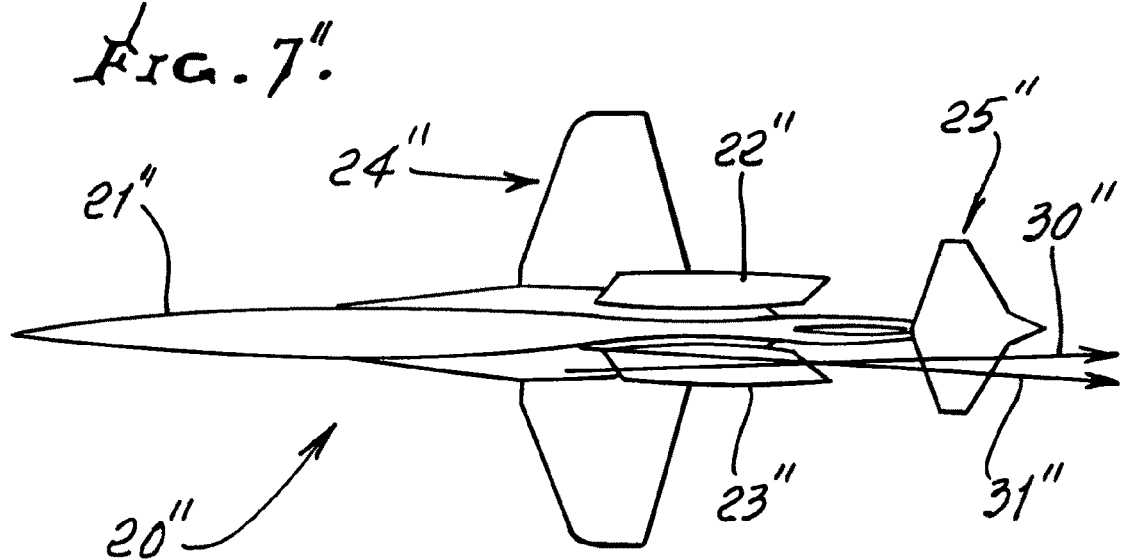
Figure 6:
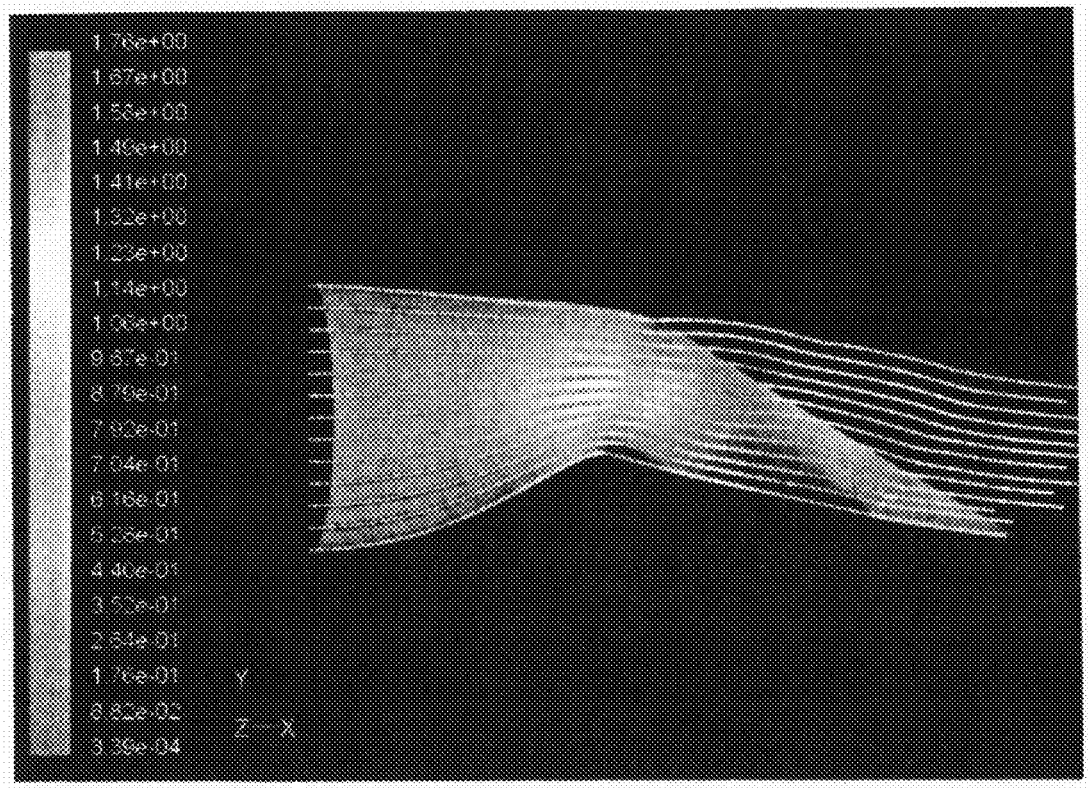

FIGS. 1' and 2' show engine inlets in separate sections;

FIG. 3' shows the second section held in contact with the first section by resilient structure;

FIG. 4' also shows multiple sections;

FIG. 1" is a diagram showing plug nozzle geometry (half section from centerline to cowl);

FIG. 2" is a view showing a supersonic aircraft incorporating this aspect of the invention;

FIG. 3" is a plan view of a portion of the FIG. 2" aircraft;

FIG. 4" is a view showing jet engine bevel nozzle surface geometry;

FIG. 5" is a graph showing a series of nozzle pressure contours and flow pathlines (for high pressure ratio at aircraft supersonic speed);

FIG. 6" is a graph showing a series of nozzle pressure contours and flow pathlines (for low pressure ratio, at aircraft low speed conditions); and FIG. 7" is a plan view of the aircraft, showing thrust vectors for supersonic and subsonic conditions.

DETAILED DESCRIPTION

In FIG. 1, two engines 10 incorporating the invention are shown as mounted proximate opposite sides of the fuselage 11 of a supersonic aircraft 12. The aircraft has a tail 13, and a wing 14 located rearwardly of the mid-point of the fuselage overall length. The engine forward extents lap the two sections 14a and 14b of the wing, as shown. The fuselage is typically indented along its length, proximate the engines, for area ruling purposes, with respect to the proximate engine nacelles and the wing sections, at their root ends.

FIG. 2 is a schematic illustrating the compression system for a basic two shock external compression inlet 20. The ramp 21 (or spike) induces an initial oblique shock system 22 followed by a terminal shock 23. Both shocks induce a total pressure loss dependent on their respective strengths. Ideally, the oblique shock and terminal shock both focus perfectly on the inlet lip at 24 with zero spillage and zero additive drag penalty. For reasons of stability previously discussed, however, practical inlets are designed to have the shocks pass slightly ahead of the inlet and allow some spillage as described above. Nacelle 25 shroud extents 25a and 25b are shown. Arrows 26a and 26b show the flowpath of entering air.

FIG. 3 illustrates a nearly-isentropic external compression system with the shock system 28 focused perfectly on the cowl lip 24. Here, the ramp 29 is shaped with curvature at 30 to provide a series 28a of infinitely weak shocks. The isentropic compression ramp geometry creates theoretically zero pressure loss up to the point of the terminal shock 35. The isentropic compression produces less total pressure loss but turns the flow to a higher angle, inducing additional cowl drag. See arrow 36.

Multi-shock and isentropic plus terminal shock systems have been manifested in practice by using spikes in circular inlet geometries, (i.e. aircraft B-58, SR-71), or segments of a circle (i.e. F-104), as well as 2-D rectangular inlets (F-15, B-1, F-22). Recently rounded 3 dimensional variations of the basic 2D rectangular inlets with the same basic external shock system characteristics using stream tracing techniques have been proposed, such as described in a patent issued to Davis.

The present invention utilizes a varying shock strength as illustrated in FIG. 4. As shown, the inlet flow 40 is first turned at 41 through a relatively shallow angle reducing its Mach number and increasing static pressure. The initial oblique shock 42 is focused just ahead of the inlet lip 43. This is followed by a relatively straight ramp section 44 providing little or no additional compression. A second ramp compression system 45 follows the straight section and is shallowly concave. The secondary oblique shock system 47 focus is inside the inlet lip and intersects the terminal shock 49 at 50. By delaying the focus of the second shock system to be inside the lip, the cowl drag is a function of the lower angle initial shock system turning angle and not the secondary, thus allowing a lower cowl lip angle and reduced drag compared to a conventional shock system of the same total pressure recovery.

The second oblique shock system is followed by a straighter ramp section 52 of low or zero curvature such that the flow in the middle, or core portion of the inlet is brought to a lower supersonic Mach number prior to shocking down in a weak terminal shock. Ahead of the terminal shock 49 however, the ramp then curves away at 54 to a somewhat reduced angle, such that the flow closest to the compression ramp is reaccelerated back to a higher Mach number before the terminal shock. The resulting compression system features a weaker terminal shock and reduced total pressure loss in the middle portion of the inlet and higher pressure loss, but lower turning angle and drag for the outer portion of the flow. This increases the net thrust of a supersonic fanjet system by allowing less pressure loss in the more sensitive core air while allowing a stronger terminal shock for stability in the less sensitive bypass air regions.

Inlet efficiency is often compared in terms of ram recovery, a zero loss in total pressure representing 100% ram recovery. The gradient pressure recovery is intended to produce ram recoveries approaching 100% in the center of the inlet where the flow will pass in to the high pressure core of the fanjet engine 56 behind it, while producing slightly lower ram recoveries (on the order of 1-5% less) for the outer flow at 57 which will bypass the engine core.

FIG. 5 illustrates Euler-code CFD analysis of an inlet incorporating the gradient pressure recovery structure of the invention. The various color gradients show the ram recovery distribution at the engine fan face for an inlet designed with a basic two dimensional ramp system (i.e. all compression ramp curvature generators occur along a series of stacked planes, with no curvature along planes perpendicular to the generating planes). The resulting pressure recovery distribution is banded with areas of highest pressure recovery (97-99%) occurring in the middle and areas of reduced recovery (91-97%) occurring along outer areas.

Non-uniform pressure recovery is un-avoidable in practical inlets with the additional effect of viscous boundary layers along the inlet walls. Non-uniform pressure recoveries tend to increase the fatigue of fan and compressor blades and reduce margins from stall or surge. All engines must be designed with some tolerance for non-uniform pressure distribution, on the order or less than 5%. In this regard, a more circular ram recovery distribution is desired, and this is accomplished by providing 3-dimensional ramp curvature. A more desirable circular pattern is attainable by adding the slight reverse curvature in planes circumscribing over 180 degrees from the center of the inlet.

The non-uniform analysis of ram recovery at Mach 1.6 for an inlet so designed is illustrated in FIG. 6.

Another benefit of the invention is greater stability from boundary layer effects, reducing or eliminating the need for terminal shock bleeds. By reaccelerating the inner flow behind the secondary oblique shock system, the boundary layer thickening or separation is stabilized. This is explained as follows: The reaccelerated flow passes through a relatively strong terminal shock and thickens or separates the boundary layer. The thickened boundary layer tends to strengthen the terminal shock and move it forward in the inlet, however the reverse curvature of the ramp tends to weaken the terminal shock as it moves forward, thus stabilizing the shock. The thickened or separated boundary layer behind this local shock area could cause an unacceptable pressure distortion to the engine and would need to be bled from the system, however compared to the conventional terminal shock bleed, it is bled downstream of the terminal shock system where much higher static pressure (and less sacrifice in total pressure) are available to induce the bleed flow.

This local shock system is illustrated in FIG. 7 showing contours of Mach number in an isometric view of a 3-dimensionally designed inlet at Mach 1.5. At the peak of the compression ramp, it is seen that the flow reaccelerates locally over the peak and shocks down beyond it. If the flow were to be reduced, the terminal shock would travel up the ramp slightly, reducing the Mach number locally and weakening the terminal shock.

In the embodiment of the invention as seen in FIGS. 1' and 2', the inlet is separated laterally into three separate sections, a moveable forward inlet section 100, a second moveable bypass section 101 and a third section 102 fixed to the forward intake 103 of the engine 104.

Forward translation of the second section with respect to the third section opens an angled aft facing slot 105 suitable for efficient bypassing of air in excess of the engine demand for high speed flight. The amount of air bypassed is regulated by the distance of translation of the second section with respect to the third.

Forward longitudinal translation of the most forward inlet section with respect to the second section exposes a rounded blunt lip 106 at the leading edge 107 of the second section 101 suitable for efficient entrainment of additional air at low speeds about the periphery of the opening created by the separation of the two sections.

For medium cruise speeds (typically high subsonic through low supersonic speeds) the inlet is in a nominal closed position. In this position the bypass area defined by the gap 107 between the second and third sections can be closed completely or allowed to always be open a small amount to induce a small bleed of inlet boundary layer air away from the engine for reduced flow distortion at the engine inlet. As the engine demand is reduced, either through increased speed or reduced power, the first and second sections translate forwardly together with respect to the third section, increasing the bypass opening and allowing excess inlet air to bypass to the outside surface. As the two sections translate forward, the first section (inlet) may be forced to tilt slightly with respect to the second section, thus tailoring the inlet's angle for the combination of Mach number and engine demand. This relative rotation can be accomplished via a track or linkage system, indicated generally at 109. Actuators are indicated generally at 110.

In the FIG. 3'a)-d) embodiment the second section is held in contact with the first section via springs or elastic linkage 111 such that both would translate together for operation of the bypass. Mechanical stops are installed to limit the bypass opening to a maximum value, and additional translation imparted on the most forward inlet section operates to expose the low speed auxiliary opening 112. In this manner both bypass and low speed functions can be controlled by a single actuator 110. In another embodiment, the inlet section and second section translation, and the inlet tilt angle are accomplished via independent actuators allowing complete control of the three functions separately.

In a further embodiment of the invention as seen in FIG. 4', the bypass, low speed, and inlet tilt angle are accomplished with two cowl sections, a forward inlet section 113 and a fixed aft section 114. In this case, the gap between the forward and aft sections incorporates geometry suitable for the bypass function when the sections are in close proximity to each other, and when separated further the wider gap between them provides the low speed auxiliary air function. As in the first embodiment, the relative angle of the forward inlet section relative to the aft section can be controlled via a track or linkage system, or controlled independently with an additional actuator system, indicated generally, at 115.

FIG. 1" shows plug nozzle geometry, in a section taken along an engine center line 10", the cowl or nacelle indicated at 11". A nacelle boat tail or rearward angled wall is shown at 11"a, with drag occurring as at 13". Iso-Mach lines are shown at 44", and extend between rearward edge 11"b of the boat tail and a ramp surface 14", along which exhaust expansion occurs. Flow lines are shown at 15".

The angle through which the flow must be turned is a function of the ratio of total pressure between the flow and local ambient conditions, with higher pressure ratios (and Mach numbers) requiring greater turning angles. The portion of the external duct curved inwards at the throat is known as the "boat tail". In supersonic flight the flow external to the duct will create a drag loss when it encounters the boat tail and is a function of the boat tail angle.

FIGS. 2" and 3" show a supersonic aircraft 20" having a fuselage 21", and first and second jet engines 22" and 23", with nacelles 22"a and 23"a. The engines extend at generally opposite sides of the fuselage 21", and they may lap forwardly wing 24", having left and right sections 24"a and 24"b, which extend closest to the fuselage. An aircraft tail appears at 25".

The engines incorporate the FIG. 1" geometry, and are positioned so that the boat tail portions 11"a are located laterally closer to the fuselage than the exhaust expansion ramps. See FIG. 1" showing fuselage side 21"a, with a relatively narrow or reduced flow gap 28" shown between 11"a and 21"a. The geometry is such that rearwardly directed thrust vectors are produced, as seen at 30" (for supersonic) and at 31", (for sub-sonic) in FIG. 7".

Reduction in boat tail drag results from proximity to the fuselage body, shown by line 21"a in FIGS. 1" and 3", and as expanding cross sections along contour line 21"a.

In addition to the reduction in boat tail drag through the proximity to an expanding fuselage body, the invention provides the added benefit of reduced yawing moment and vertical tail size needed to counter an engine failure at low speed such as takeoff. This is due to the asymmetric characteristic of the thrust vector for different pressure ratios of the nozzle. This is illustrated in the flow vectors from CFD analysis of a nozzle geometry incorporating the surface expansion surface. FIG. 5" shows the flow paths for the nozzle operating at the high pressure ratio typical of supersonic operation. Here the nozzle is at design capacity and the flow is turned nearly in line with the freestream direction.

As the pressure ratio of the nozzle drops below its design point, such as for low speed conditions such as takeoff, the turn angle reduces and the flow tends to follow the expansion ramp angle, changing the direction of the thrust vector.

For the nozzle arranged as described next to the fuselage, the net thrust vector is angled slightly inboard towards the center of gravity, reducing the yawing moment generated if the engine on one side is at reduced thrust compared to the other such as in an engine failed condition. This allows a vertical tail and rudder of reduced size to maintain control of the aircraft in low speed emergency engine failure conditions with requisite reduction in weight and drag.

An additional benefit to the inward facing bevel nozzle configuration is the shielding effect of the fuselage and nozzle in reducing propagation of acoustic noise. It uses the fuselage and inward facing nozzle expansion surfaces to increase the effective length of the nozzle without added wetted area. These areas can be provided with acoustic liners for additional noise reduction.

See also FIGS. 5" and 6".

The contours of the supersonic aircraft are preferably "area ruled", that is the contours of the aircraft bodies such as wings, fuselage, and nacelles are generated such as to smooth the combined cross-sectional areas of the bodies in such a way as to minimize the wave drag penalties of the complete configuration. Typically this involves reducing the cross-section of one body when it is in the vicinity of another body, the classic example being the "wasp waisting" of the fuselage where the wing intersects it. The nacelle containing the engine, air inlet system, and exhaust nozzle system represents a large cross-section. Wave drag is significantly reduced by further reducing the cross-section of the fuselage in near proximity to it.

FIG. 3" is a close up view of the engine nacelle with inward facing "bevel" nozzle and its relationship to the fuselage. Adjacent to the maximum cross-section of the nacelle the fuselage is "waisted" (narrowed in cross section) in accordance with supersonic area rule considerations. Further aft, the nacelle cross-section reduces in the vicinity of the nozzle exit and the fuselage area expands as at 21"*a* to maintain overall aircraft cross-section for area ruling. The expansion of the fuselage area adjacent to the nozzle aft end provides a surface angle symbiotic with the boat-tail angle needed for the nozzle exit, the combination reducing the drag of the boat-tail through its over-all integration with the full configuration area rule requirements.

Note in FIG. 3", the following conditions:
1) The fuselage has reduced lateral cross sections along the fuselage length at zones closest to the first and second jet engine nacelles.
2) The reduced cross sections of the fuselage relative to the first and second jet engine nacelles define an area ruled configuration or configurations.
3) The reduced cross sections of the fuselage relative to both jet engine nacelles and to the wing section or sections closest to the fuselage define an area ruled configuration or configurations.
4) The gap 60" between the engine nacelle and the fuselage side is typically less in width than the engine nacelle width, laterally outwardly of the gap, at lateral stations lengthwise of the gap.

Claim 1 herein refers to preferred structure.

We claim:

1. A supersonic aircraft jet engine installation having an inlet cowl assembly comprising:
   a) said cowl assembly having three separate generally tubular sections,
   b) said sections including a first forward inlet section that is forwardly translatable, a second bypass section that is forwardly translatable with respect to the first section, and a third section fixed to an engine structure, the forward inlet section having a forward position everywhere openly spaced entirely forwardly of the second section.

2. The cowl assembly of claim 1, wherein a side air intake is opened for bypassing of air into the engine when said inlet section is in said forward position.

3. The cowl assembly of claim 2 wherein said side air intake extends circumferentially.

4. The cowl assembly of claim 3 wherein the second section has an arcuately blunted leading edge exposed for efficient entrainment of additional intake air at low aircraft speeds, in response to first section translation forwardly relative to the second section.

5. The cowl assembly of claim 4 wherein the first and second sections have simultaneously forwardly translated positions, relative to the third section, whereby a circumferential opening between the second and third sections is increased to allow excess inlet air to bypass to the exterior.

6. The cowl assembly of claim 5 wherein the first section has a tilt position relative to the second section as the first and second sections are translated forwardly.

7. The cowl assembly of claim 3 wherein the first and second sections have simultaneously forwardly translated positions, relative to the third section, whereby an opening between the second and third sections is increased to allow excess inlet air to bypass to the exterior.

8. The cowl assembly of claim 7 wherein the first section has a tilt position relative to the second section as the first and second sections are translated forwardly.

9. The combination of claim 7 wherein circumferential openings are opened with co-existence when the first section is translated forwardly relative to the second section, and the second section is translated forwardly relative to the third section.

10. The combination of claim 7 including actuator means holding the first and second sections in relatively fixed closed positions when the second section is translated forwardly relative and the third section.

11. The combination of claim 2 wherein the aircraft has a wing, the first jet engine nacelle having a forward portion lapping the wing, and wherein the fuselage has reduced cross sections along fuselage length at zones closest to the first jet engine nacelle forwardmost portion.

12. The combination of claim 11 wherein the reduced cross sections of the fuselage relative to both the first jet engine nacelle and the wing section closest to the fuselage define an area ruled configuration or configurations.

13. The combination of claim 1, wherein
   c) said cowl assembly has forward and rearward separable in line air intake sections,
   d) said in line air intake sections have primary relatively closed positions,
   e) said in line air intake sections have secondary relatively separated positions to provide an air passing gap therebetween,
   f) and means for controlling relative tilt of the in line air intake sections to controllably vary the geometry of said air passing gap.

14. The combination of claim 13 wherein said f) means includes an actuator operatively connected to the forward section to vary tilt thereof relative to the rearward section.

15. A supersonic aircraft jet engine installation having an inlet cowl assembly comprising:
   a) said cowl assembly having two separate generally tubular sections,
   b) said sections including a first inlet section that is forwardly translatable, and a second section fixed to an engine structure,
   c) there being a gap between said first and second sections, the gap characterized in that a bypass function is provided when the sections are in close proximity to each other, and a low speed auxiliary air function is provided when the two sections are separated by a wider gap.

16. The cowl assembly of claim 15 wherein means is provided for controlling bodily translation of said forward section, thereby to control said gap.

* * * * *